INVENTOR.
Frank A. Leisey

INVENTOR.
Frank A. Leisey 3,462,244
METHOD AND APPARATUS FOR MEASURING
REACTIVE CONSTITUENTS
Frank A. Leisey, Chicago, Ill., assignor to Standard Oil
Company, Chicago, Ill., a corporation of Indiana
Filed Feb. 28, 1966, Ser. No. 538,444
Int. Cl. G01n 33/20
U.S. Cl. 23—230     7 Claims

ABSTRACT OF THE DISCLOSURE

Method and apparatus for measuring the amount of an alkyl lead compound in a sample of hydrocarbon liquid. An excess of 10–100 fold of silver ions is added to a predetermined sample amount of hydrocarbon liquid contained in a colorimetric cell. The alkyl lead compound reacts with the silver ions to produce silver metal, and the amount of silver metal so formed is then photoelectrically measured. The cell is periodically washed with an acid to clean it of silver metal.

---

This invention concerns method and apparatus for detecting the presence of reactive substances in hydrocarbon-containing vessels. The invention more particularly relates to apparatus and method for determining the presence and the amounts of reactive substances in flow lines containing hydrocarbons such as gasoline. The invention specifically concerns the detection and determination of the amounts of reactive substances, such as TMEL, TEL, etc., in gasoline and other fluid hydrocarbon samples.

Monitoring onstream fluids at various points throughout a plant flow system or in a processing scheme is an essential operation in the pharmaceutical, chemical, petrochemical and petroleum processing industries to establish control and to achieve the standards of quality desired in the final products. Within the petroleum industry the "Bromine Index" is an example of a standard of measurement of the olefin content of streams monitored for process control. Similarly, the "Mercaptan Number" expresses the amount or content of mercaptan-sulfur which is found in process streams through a line monitoring system. The Shortening and Edible Fats and Oils Industry expresses the hydrogen saturation level of raw feeds as the "Iodine Number" determined from samples which may be taken from feed lines at monitoring stations located at critical process points.

The usual manual monitoring procedure includes the gathering of a sample from a line or feed stream, transporting the gathered sample to a laboratory, quantitatively and/or qualitatively analyzing the sample, evaluating and translating the data arising out of the analysis, and transmitting the information back to the plant or process control center for the execution of changes indicated by the information transmitted. The disadvantages of such a monitoring procedure are myriad; however, the chief weaknesses are the inordinate lengths of the time intervals between sampling and obtaining the raw data and final information, and the attendant inaccurcies rising out of human error. Such disadvantages can be very costly because long time intervals between sampling and obtaining results may allow the continuation of processing of large quantities of substandard feeds, an erroneous analytical results may also permit the further processing of constituents that yield an unacceptable finished product. In a fluid blending operation the ability to obtain fast, accurate useable data through a continuous analytical monitoring system assures efficient intermediate and end-product quality control; whereas, the absence of a fast, accurate analyzing monitor may result in plant downtime and the loss of product costing thousands of dollars when constituents are improperly blended or reacted in a phase of a continuous process.

Heretofore, it has not been possible to turbimetrically measure the tetraethyllead and tetramethylethyllead content of a gasoline sample in an electrolyte containing silver ions if the gasoline contained a significant amount of mercaptans. Where the mercaptan content is high, silver mercaptides form and produce a dark precipitate of silver mercaptides that ties up silver ions.

It is, therefore, an object of this invention to provide method and apparatus for quickly, accurately, and continuously monitoring and analyzing at preselected intervals the tetramethylethyllead and tetraethyllead content of hydrocarbon streams such as gasoline.

It has been discovered that contrary to the previously known technology, the amounts of tetramethylethyllead and tetraethyllead in gasoline can be determined quickly, accurately, and inexpensively by a relatively simple method and apparatus wherein samples of gasoline containing substantial levels of normally interferring mercaptans are taken at preselected intervals of time and subjected to an excess of a reactive electrolyte solution in a recording colorimeter to turbimetrically measure the resulting colloidally suspended precipitate in the electrolyte-sample mixture. This discovery includes method and means for accurately sampling a hydrocarbon stream, removing the sample from the sampling means, measuring any change in light transmission through a cell containing the sample, recording said change, washing the cell, and adjusting the instrumentation of reflect any changes in light source intensity or transmissivity, and any changes in relative volumes of fluids introduced into said cell.

One embodiment of this invention provides for the monitoring and measuring of the tetraethyllead and tetramethylethyllead content of new gasoline out of blending facilities notwithstanding the presence of substantial levels of mercaptans to prevent the delivery of offtest product to the consumer. The continuous recording analyzer developed is based upon the reaction of silver ions in an electrolyte with tetraethyllead and/or tetramethylethyllead to form colloidal metallic silver. For example, it is believed that tetraethyllead reacts with silver nitrate in an alcohol solution to produce ethyl silver shown as:

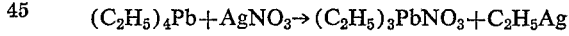

The ethyl silver is apparently thermally unstable and almost immediately decomposes to form metallic silver and free radicals as,

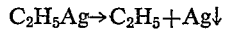

The silver liberated in the alcoholic solution gives a yellow to brownish-black coloration that changes the optical density of the solution. This density is determined by a photoelectric colorimeter which records the changing optical density of the solution on a chart. A standard calibration curve can then be compared with the chart-recorded data to determine the tetraethyllead or tetramethylethyllead content of the fuel.

Ordinarily, the effect of mercaptan content is experienced when the mercaptan number exceeds five. However, it has been found that a large excess of silver ions, such as excess amounts between about 10–100 fold, i.e. at least 10 fold, over the stoichiometric amount of silver ions required to titrate the maximum expected amount of alkyl lead compound in the sample, permit the accurate measurement of tetramethylethyllead or tetraethyllead in gasoline samples. If the mercaptan number exceeds five, a dark precipitate usually forms. It should be noted that it is necessary to have a calibration curve for each different mixture of metallic alkyls used in the gasoline.

This invention provides for other embodiments and uses to detect and measure constituents that produce a specific reaction which changes the optical density of the reacting medium in proportion to the amount of the constituent in the sample. The amount of ammonia and ammonium salts contained in a sample may be determined by the addition of an alkaline potassium mercuric iodide solution (Nessler Reagent) to produce a color change having an intensity proportional to the ammonia and ammonium content. The measurement of nitrogenous substances which can be reduced to ammonia can similarly be measured. The quantitative determination of iron in which ferrous iron reacts with orthophenanthroline reagent to produce an orange-red ion whose color intensity is proportional to the ferrous iron content of a sample may also be carried out within the spirit of this invention. Turbidimetric measurement of the soluble sulfate ion in a sample placed in a barium chloride reagent may be made by this novel method and apparatus because the barium sulfate precipitate changes the optical density of the reacting medium in proportion to the soluble sulfate ion content.

This invention provides method and apparatus for the accurate and efficient detection and measurement of any specific constituent of interest which yields a precipitate, haze, color, or other characteristic that changes the optical properties of a reagent with which the constituent quantitatively reacts. The novel apparatus and method of this invention provides an automatic and continuous control of fluid wherein anions, cations, and organic compounds either in liquid or gaseous states may be readily determined.

The invention is shown in an illustrative embodiment, by the accompanying drawings, in which.

Other objects and advantages and a better understanding of this invention may be obtained by referring to the following description and examples in addition to the aforementioned drawing.

Figure 1:
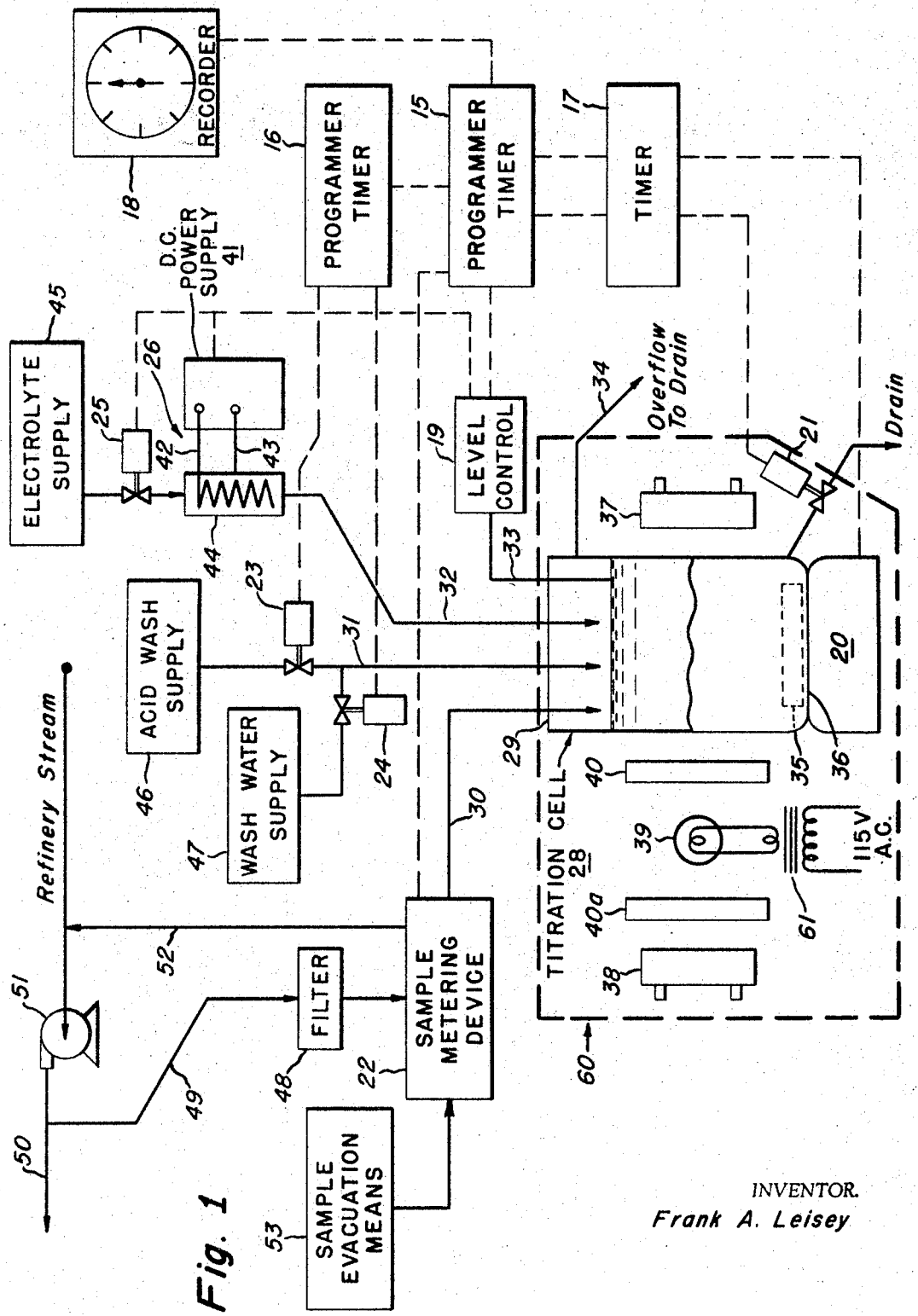
FIG. 1 is a block diagram of the analyzer.

FIG. 1 of the drawing illustrates diagrammatically one embodiment of the invention wherein reference numeral 15 designates the programmer timer electrically connected with programmer timer 16, timer 17 and recorder 18. Timer 15 is also connected to colorimeter cell level control 19, magnetic stirrer 20, colorimeter cell solenoid drain valve 21, and sample metering means 22. Timer 16 is connected with timer 15 and acid wash supply solenoid valve 23 and wash water supply solenoid valve 24. Level control 19 is connected to electrolyte supply solenoid valve 25 and coulometric generation means 26.

The colorimeter means includes titration cell 28 having a top 29 adapted to receive sample line 30, wash line 31, electrolyte line 32, and level control line 33. Spaced below top 29, overflow drain 34 extends from cell 28 which has stirrer 35 resting on the reservoir bottom 36. Adjacent titration cell 28 is measuring photocell 37 opposite reference photocell 38, the cells having therebetween cell 28, lamp means 39 and light filters 40 and 40a.

Coulometric generation means 26 includes direct current supply source 41, silver anode 42 and stainless steel cathode 43 in electrolytic cell 44. Electrolyte supply tank 45 communicates through solenoid valve 25 with electrolytic cell 44, and from cell 44 through line 32 to colorimeter cell 28.

In one embodiment in the apparatus portrayed in FIG. 1 coulometric generation means 26 may be removed or disconnected from the apparatus leaving electrolyte supply tank 45 feeding directly into titration cell reservoir 28 through solenoid valve 25 and line 32. In this embodiment the electrolyte in tank 45 will contain the reactive substance formerly provided by the coulometric generator.

Acid wash supply tank 46 communicates with cell 28 through solenoid valve 23 and line 31 and wash water supply tank 47 communicates with titration cell 28 through solenoid valve 24 and line 31.

Sample metering means 22 communicates with sample evacuation means 53 via line 53a not shown along with filter 48 through line 49 to pipeline 50 at the high pressure side of pump 51, and sample return line 52 is the communication means between the return side of sample metering means 22 and pipeline 50 on the low pressure side of pump 51.

Figure 2:
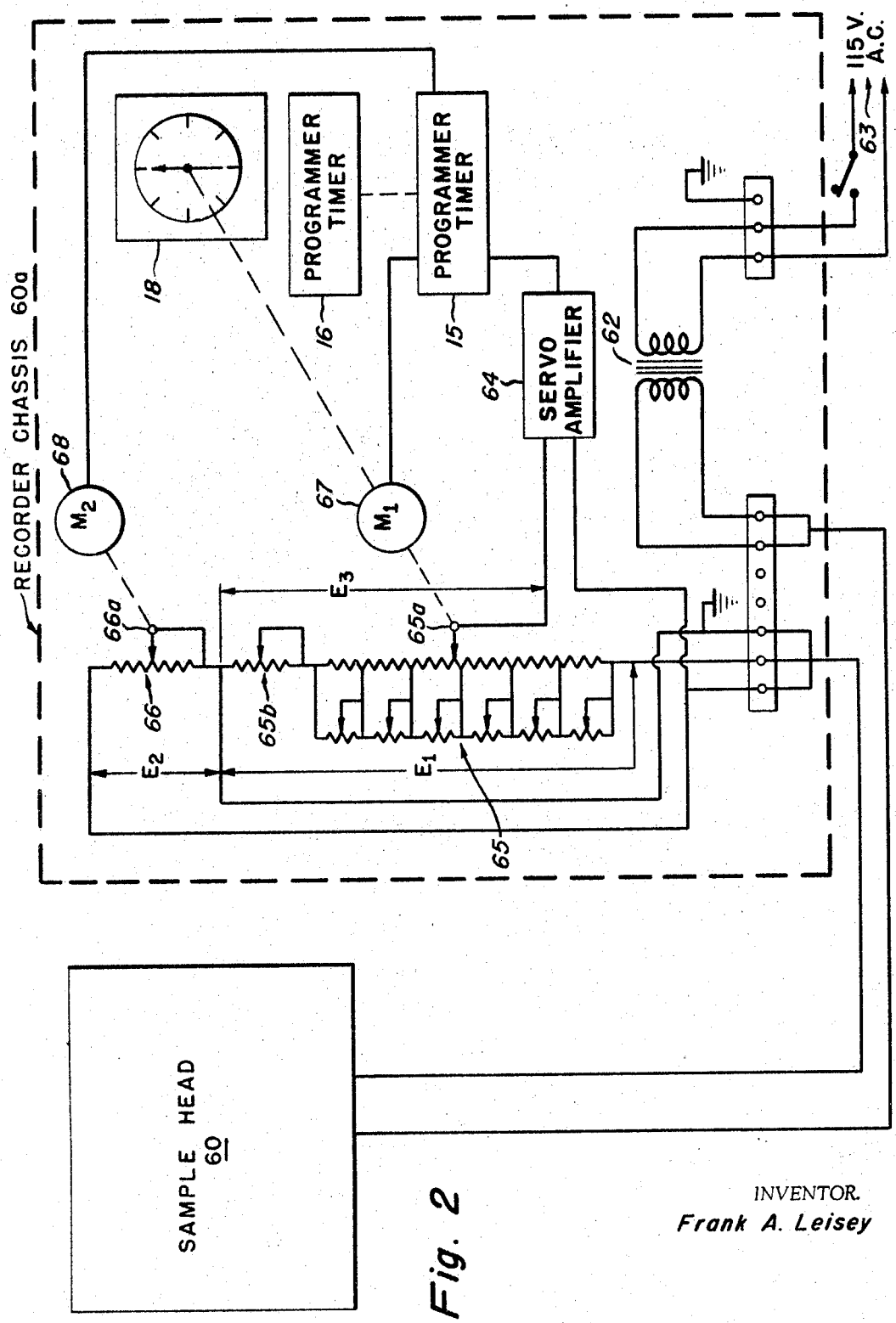
FIG. 2 is a schematic diagram of the colorimeter and recording circuit.

FIG. 2 depicts a schematic diagram of the recording and colorimeter circuitry wherein sample head means 60 including measuring and reference cells 37 and 38, respectively, magnetic stirrer 20, light source 39 and filters 40 and 40a are enclosed in an explosion proof housing not shown.

Light source 39 is electrically connected through 5 volt transformer 61 to constant voltage transformer 62 in recorder chassis 60a which is joined with 115 volt source 63. Photocells 37 and 38 are electrically connected through the servo amplifier 64 and tapped slide wire 65, the zero-adjustment potentiometer 66, and the recorder 18 which is also interconnected with slide wire 65 through drive motor 67. The zero adjustment potentiometer 66 is connected through drive motor 68 to timer 15.

Figure 3:
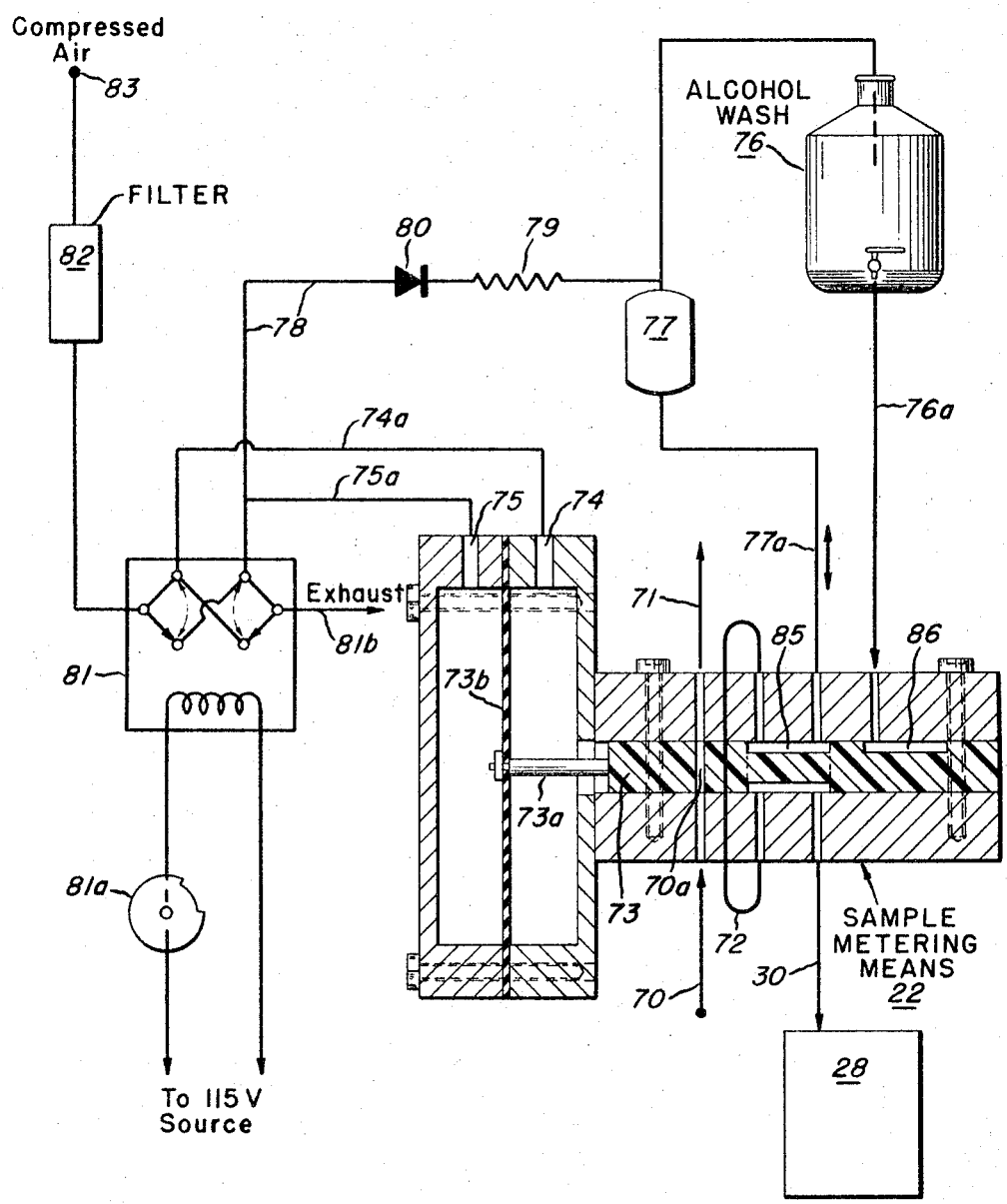
FIG. 3 is a more detailed diagram of the sample introduction apparatus.

FIG. 3 portrays one embodiment of the apparatus used during the sample introduction cycle including titration cell 28, communicating with sample metering means 22 through sample flow line 30. Metering means 22 includes sample inlet line 70, sample outlet line 71, sample loop 72, sample slide valve 73, slide linkage 73a, and diaphragm 73b. Pneumatic ports 74 and 75 communicate with slide valve 73 through diaphragm 73b and linkage 73a within sample metering means 22. Cam-operated switch 81a is connected with timer 15 and 4-way pneumatic valve 81 which communicates with ports 74 and 75, and reservoir 77 via lines 74a, 75a and 78, respectively.

Alcohol wash line 76a extends from alcohol supply 76 to sampling means 22, and alcohol line 77b not shown extends from supply 76 through reservoir 77 to sampling means 22. Extending from reservoir 77 is pneumatic line 78 having a 100 cc./min. air restrictor 79 and pneumatic line check valve 80. Line 78 communicates through 4-way pneumatic valve 81, and air filter 82 to air pressure source 83.

In operation, sample fluid flows from pipeline 50 shown in FIG. 1 to be on the high pressure side of pump 51, through line 49 and filter 48 to sample metering means 22 where an accurately measured amount of the sample is taken at the direction of programmer timer 15 and delivered through line 30 to titration cell 28.

The delivery of the sample from metering means 22 may be carried out by evacuating the sample cavity through the force of air or inert gas under pressure so that the small amount of sample is delivered intact through line 30 to the titration cell 28. This forced evacuation of the sampling means prevents the deposition of portions of the liquid sample at various points along the inner surface of the line and sample cavity which normally would result under atmospheric conditions due to surface tensions and attractions.

The programmer timer 15 causes electrolyte to flow from supply 45 through solenoid valve 25 into the electrolytic cell 44 where silver ions previously coulometrically generated by means 26 including stainless steel cathode 43, silver anode 42, and cell 44 are picked up by the electrolyte. The electrolyte flows by gravity through cell 44 and line 32 into titration cell 28 where upon reaching a predetermined height, contact is made with level control line 33, and solenoid valve 25 closes to stop the electrolyte flow.

In one embodiment of the apparatus shown in FIG. 1, the programmer timer 15 connected through level control 19 to solenoid valve 25 causes electrolyte containing the particular reactive substance to flow through valve 25 and line 32 directly to titration cell 28. In this modification coulometric generation means 26 including cell 44 and electrodes 42 and 43 may be disconnected or absent from the system, since the electrolyte contains the reactive substance that might have been produced by the generator. For example, the electrolyte in supply tank 45 may include 50 grams of silver nitrate per gallon of ethyl alcohol when the apparatus is used for detecting and measuring the amount of tetraethyllead or tetramethylethyllead in gasoline samples. When an 80 micro liter sample of gasoline is taken for each determination, 2 ml. of the alcohol wash is delivered through valve 22 and line 30 directly to titration cell 28. The electrolyte supply tank may contain large quantities of the solution so that determinations can be made at five-minute intervals through the operation of programmer timer 15 or at fifteen-minute intervals through the activation of timer 17.

Programmer timer 15 causes magnetic stirrer 20 to thoroughly mix the electrolyte containing the measured amount of pipeline sample during which time the reaction between the pipeline sample and the electrolyte occurs, causing a change in the optical density of the fluid in titration cell 28.

Referring now to FIG. 2, when the electrical circuit to the recorder 18 is energized, the system adjusts the output of measuring photocell 37 which in turn adjusts the light transmission through the colorimeter cell 28 to a fixed value of 100% light transmission before a sample is deposited in titration cell 28. Light source 39, measuring photocell 37, and reference photocell 38 shown in FIG. 1 are electrically connected to the recorder chassis 60a through the load resistor means 65 and 66 to the input of the motor servo amplifier 64, whose output drives the recorder 18. The output of reference photocell 38 appears across tapped slide wire 65 and resistance 65b, and this output is indicated as E1 on the drawing in FIG. 2.

The reference photocell 38 supplies a relatively constant reference voltage to the resistance network 65 and 65b. This reference voltage is dependent upon the output of colorimeter lamp 39. The circuit compensates for the aging of the lamp as well as line voltage variations. The measuring photocell 37 measures the light transmitted through filter 40 and titration cell 28 and the output appears across the zero-adjustment potentiometer 66 and its voltage output is designated E2 in the drawing. Polarities in the outputs of reference photocell 38 and measuring photocell 37 are such that the total output E2 of the measuring photocell 37 is fed into servo-amplifier 64 in series opposition with a fraction of the voltage output of the reference photocell 38. This fraction of the output of the reference photocell 38 is indicated by the designation E3 in the drawing. The servo-amplifier 64 senses any difference in signal amplitude between E2 and E3, amplifies this "difference" signal, and applies the output resulting from the "difference" signal to drive motor 67. Since motor 67 connects recorder 18 and tapped slide wire 65 at 65a, motor 67 drives the slide wire 65 at 65a in a direction to cause the input voltage to the servo-amplifier 64 to become zero.

The circuit is so arranged that the amplifier input E3 automatically drives recorder 18 and the slide wire 65a to a condition where the input signal to the servo-amplifier 64 is always zero. If the colorimeter measuring cell 37 output signal E2 changes in value, this voltage when subtracted from E3 becomes the total input to servo-amplifier 64, thereby driving the amplifier 64 and the slide wire 65 in a direction to make the signal zero. Motor 67 can drive slide wire 65 to a position wherein E3 will always equal E2 and at this point the recorder 18 will stop and this reading on recorder 18 is a direct reading of the transmission of light through titration cell 28.

When the cycle commences with the electrolyte being thoroughly mixed in titration cell 28, the measuring photocell 37 has been adjusted as above defined to a constant reference signal and the recorder 18 has been forced to read zero. This is accomplished through programmer timer 15 which electrically signals recorder 18 to the zero position and then timer 15 switches the motor of amplifier 64 to the zero adjustment slide wire 66a which varies the output amplitude E2 of the signal of the measuring photocell 37 by varying the resistance load across potentiometer 66 on the measuring photocell 37. In this manner compensation is made for any interference in light transmission ability from lamp 39 through filter 40 and titration cell 28 to measuring cell 37. The variation in the intensity of light reaching cell 37 may be caused by a weak light source or a dirty filter or because silver has been deposited on the walls of the titration cell 28. By compensation in this manner, the system is in effect adjusting the electrolyte in the cell to 100% light transmission at the zero reading on the recorder.

Following the zero reading compensation by the system, if a gasoline sample containing tetraethyllead and tetramethylethyllead is added to the cell and mixed with electrolyte containing silver, the silver precipitate that forms decreases the intensity of light reaching the measuring photocell 37, and this value is reflected on recorder 18. Programmer timer 15 switches the output E3 of the servo-amplifier 64 to the drive motor 67 of recorder 18 and since motor 67 is connected to the slide wire 65 at 65a, the recorder 18 records the output of the colorimeter cell located in sample head 60. The total time required to complete one cycle is about 5 minutes, and programmer timer 15 takes a sample at 5-minute intervals; however, timer 17 can be switched into the circuit allowing a sample to be taken at 15-minute intervals. Following the making of a record by recorder 18 programmer timer 15 causes solenoid drain valve 21 to open, causing the fluid to drain out of the titration cell 28. After 100 to 600 determinations programmer timer 16 is then caused to function and signals acid wash supply solenoid valve 23 to open, thereby passing acid wash solution through the titration cell to clean the cell and drain through valve 21. The acid wash is followed by a rinse cycle wherein wash water from supply 47 flows through valve 24 and line 31 to thoroughly remove accumulation from titration cell 28.

FIG. 3 portrays apparatus for gathering a sample and delivering the sample to titration cell 28. The apparatus shown operates in a novel fashion which incorporates the use of compressed air and an alcohol wash solution for moving the sample from the pipeline through the measured sample cavity 72 and into the titration cell 28 for colorimetric measurement. Cam-operated switch 81a driven by programmer timer 15, shown in FIG. 1, actuates 4-way pneumatic valve 81 into a position so that air under pressure is introduced through filter 82 to either port 75 or 74 of sample valve means 22. At the beginning of a cycle, switch 81a is driven by programmer timer 15 and 4-way pneumatic valve 81 is switched in a manner so that air under pressure is introduced at port 74, causing slide means 73 to move to the left, thereby aligning sample cavity 85 with the sample introduction line 70 and the sample return line 71. In this position sample cavity 85 also communicates with loop 72 so that fluid fills the sample cavity 85 and loop 72 and then flows out the sample return line 71 for as long as slide means 73 remains in the left position due to the air pressure introduced at port 74. While slide means 73 is in the left position, the alcohol wash solution from container 76 flows by gravity through line 76a into wash cavity 86 and up through communicating line 77a, filling reservoir 77, and rising in line 77b not shown to the level of the solution in container 76. The volume of reservoir 77 allows the introduction of 3 ml. of alcohol wash solution through sample cavity 85 which holds 80 micro liters of sample.

Cam switch 81a is now directed by timer 15 to actuate 4-way valve 81, thereby introducing air under pressure into port 75 of sampling means 22 and simultaneously exhausting to the atmosphere the pneumatic pressure previously applied at 76 through exhaust valve 81b. The pressure introduced at port 75 causes the sample slide means 73 to move to the right, aligning sample cavity 85 with line 30 communicating with titration cell 28, and simultaneously pressure is introduced into line 78 through check valve 80 and restrictor 79. Restrictor 79 allows 100 cc. per minute of air to pass into reservoir 77 which drives a measured amount of alcohol wash solution through line 77a, sample cavity 85, loop 72, and into titration cell 28 via line 30.

Obviously, loop 72 is adapted to sampling means 22 to permit the gathering of a large volume of sample; however, cavity 85 could be used to accommodate the desired sample volume and the necessity for loop 72 could be obviated. In this case, channel 70a communicating directly with sample feed line 70 and sample return line 71 could be substituted for loop 72, thereby simplifying the structure of sampling means 22. Should such a modification be made, operability would not be sacrificed.

When the sample has been flushed into the titration cell 28 by the measured amount of alcohol wash solution driven by fluid pressure entering reservoir 77 through restrictor 79 and line 78, the colorimeter cell encased in sample head 60 functions in combination with recorder chassis 60a to yield a reading on recorder 18. The record made by recorder 18 is a function of several factors including the amount of electrolyte deposited in titration cell 28, the size of the sample, the reactive substance content of this sample, and the amount of the alcohol wash solution used to flush the sample out of sampling means 22 and into titration cell 28. Due to the programming of this system and the structural elements including reservoir 77, pneumatic line 78 and restrictor 79, the amount of alcohol wash solution is always a constant value and the sample volume taken by sampling means 22 is also unchanged as well as the amount of electrolyte introduced. Consequently, the unitary variable is the amount of reactive substance contained in the sample; therefore, the reading of the recorder 18 is directly proportional, in view of the above constant operating conditions, to the reactive substance content of the hydrocarbon sample, so recorder 18 can be calibrated to read in proportion thereto. If no reactive substance has been added to the sample, upon the completion of the cycle, the recorder 18 will remain at the 100% level of light transmission and, hence, recorder 18 will read zero.

Another factor contributes to the flexibility of the subject instrumentation in that the range of the instrument can be adjusted by comparing the relationships of the volume of the sample size to the volume of the portions of electrloyte use. The incorporation of this flexibility can best be seen by reference to FIG. 2 wherein a potentiometer designated 65b is operative to allow an adjustment of the reading of recorder 18 when the total fluid level in cell 28 changes. The fine adjustment in calibration is made by varying the setting of potentiometer 65b. For example, if the position of the level control is inadvertently changed during cleaning or maintenance, this fine adjustment means allows compensatory adjustments for the volume variations.

Example I

Ten samples of gasoline containing known amounts of lead alkyls determined by X-ray were gathered and analyzed by the apparatus and method disclosed and claimed herein. The procedure including the deposition of 10 mls. of electrolyte from a source containing 10.6 liters of 3A alcohol, 180 gm. of silver nitrate crystals, and 0.1 liter of distilled water into cell 28 to the height of the level control was followed. Subsequently, the autozeroing device functioned to establish a zero reading on the recorder and an 80 micro liter sample of gasoline was gathered from the pipe line by the sampling means. The 80 micro liter sample was flushed from the sample cavity to the titration cell by 2 mls. of alcohol wash solution moved from the wash reservoir through the cavity and into the cell by compressed air. Despite the fact that the color of some gasoline samples varied considerably, no color effect occurs due to the great dilution factor resulting from the large amount of total fluid in contrast to the size of the sample. The magnetic stirrer mixed the solution and the measuring and photo cells became operative to cause the transmission of signals through the resistance circuits in the recorder chassis to the recorder to give the comparative data shown below. Following the making of the record the cell was drained and ready for the next determination.

TABLE I.—ANALYSIS OF GASOLINE SAMPLES OF KNOWN ALKYL LEAD CONTENT

| Lead alkyl conc., gm./gal. | | |
|---|---|---|
| Known | Determined | Deviation |
| 1.20 | 1.18 | −0.02 |
| 1.74 | 1.76 | +0.02 |
| 1.80 | 1.95 | +0.05 |
| 2.10 | 2.00 | −0.10 |
| 2.16 | 2.05 | −0.11 |
| 2.40 | 2.25 | −0.15 |
| 2.40 | 2.50 | +0.10 |
| 2.75 | 2.83 | +0.08 |
| 2.90 | 2.90 | 0.00 |
| 3.00 | 3.10 | +0.10 |

Average deviation ±0.07.

Example II

Two hundred and forty determinations each at five-minute intervals were made continuously throughout a 20-hour period in a manner similar to that defined in Example I with the additional acid wash and water rinsing steps occurring at the end of the runs. The record was made on a calibrated chart. The gasoline was found to contain an average of 2.45 gm./gal. of lead alkyls and the average deviation was found to be 0.060 gm./gal. of lead alkyls. The A.S.T.M. standards for repeatability and reproducibility are within 0.084 and 0.126, respectively, for this given lead concentration.

While in the foregoing specification this invention has been described in relation to preferred embodiments thereof, and many details have been set forth for the purpose of illustration, it will be apparent to those skilled in the art that the invention is susceptible to other embodiments and that many of the details set forth herein can be varied considerably without departing from the basic principles of the invention.

I claim:

1. In a method for measuring the amount of an alkyl lead compound in a sample of hydrocarbon liquid wherein silver ions are added to a predetermined sample amount of hydrocarbon liquid contained in a colorimetric cell, whereby silver metal forms in said cell, and then the amount of silver so formed is measured photoelectrically, the improvement comprising adding excess silver ions over the stoichiometric amount of silver ions required to titrate the maximum expected amount of alkyl lead compound in the sample, said excess being at least 10 fold, whereby the effect of any mercaptan which may be in the sample is overcome.

2. The method set forth in claim 1 wherein the cell is periodically washed with an acid wash to clean the cell of silver metal.

3. A device for measuring the amount of alkyl lead compound contained in a hydrocarbon liquid, comprising:
means for supplying silver ions;
means for collecting a predetermined sample amount of said hydrocarbon liquid;

colorimetric cell means in communication with said supplying means and said collecting means;

means for introducing into said cell said collected sample amount along with excess silver ions over the stoichiometric amount of silver ions required to titrate the maximum expected amount of alkyl lead compound in the sample, said excess being at least 10 fold, whereupon silver metal forms in said cell and reduces the light transmittance of said cell;

photoelectric means, including zero adjusting means, adjacent said cell for measuring the reduction in light transmittance of said cell and thereby indicating the amount of alkyl lead compound contained in said sample; and means for flushing the cell of sample after measurement of the reduction in light transmittance, said flushing means including means for periodically washing the cell with an acid to clean the cell of silver metal deposited therein.

4. The device defined in claim 3 wherein the collecting means includes means for washing said collecting means with alcohol, and said introducing means includes means for directing compressed gas through said collecting means to force the sample amount and alcohol therefrom.

5. The device defined in claim 3 wherein said supplying means includes means for coulometrically generating said silver ions.

6. The device defined in claim 3 additionally including recorder means for recording measurements, and programming means for periodically collecting sample amounts from a stream of hydrocarbon liquid and programming the device to automatically perform said measurement.

7. The device defined in claim 3 wherein said sample collecting means includes:

a supply of an alcoholic wash medium;

support means having a first opening therein communication with the hydrocarbon liquid to be sampled, a second opening therein in communication with said supply of alcoholic medium, and a third opening therein in communication with the cell means;

a member which has a sample cavity therein and which is movably mounted in said support means and operable between at least two positions, said member in the first position being aligned opposite said first opening so that a sample of the hydrocarbon liquid fills said cavity, and said member in the second position being aligned opposite said second and third openings so that the alcoholic wash medium can flow through said cavity and wash sample contained therein into said cell means; and means for moving the member between said positions.

References Cited

UNITED STATES PATENTS

| | | |
|---|---|---|
| 2,846,121 | 8/1958 | Ronnebeck. |
| 2,950,396 | 8/1960 | Schneider _____ 23—253 XR |
| 2,989,377 | 6/1961 | Leisey _____ 23—230 |

FOREIGN PATENTS 146,064  7/1962  Russia.

OTHER REFERENCES

Smith, V. A., et al.: Anal. Chem. 22, 1230–1, October 1950.

MORRIS O. WOLK, Primary Examiner

R. M. REESE, Assistant Examiner

U.S. Cl. X.R.

23—253; 73—422; 137—625.48; 222—133, 194, 334